(12) United States Patent
Shinagawa et al.

(10) Patent No.: US 8,160,344 B2
(45) Date of Patent: Apr. 17, 2012

(54) ITERATIVE SEGMENTATION OF IMAGES FOR COMPUTER-AIDED DETECTION

(75) Inventors: Yoshihisa Shinagawa, Downingtown, PA (US); Gerardo Hermosillo Valadez, West Chester, PA (US); Bing Jian, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 449 days.

(21) Appl. No.: 12/424,031

(22) Filed: Apr. 15, 2009

(65) Prior Publication Data

US 2009/0263000 A1    Oct. 22, 2009

Related U.S. Application Data

(60) Provisional application No. 61/046,823, filed on Apr. 22, 2008.

(51) Int. Cl.
*G06K 9/00* (2006.01)
(52) U.S. Cl. ........................................................ 382/131
(58) Field of Classification Search .................. 382/131
See application file for complete search history.

(56) References Cited

U.S. PATENT DOCUMENTS

| | | | |
|---|---|---|---|
| 7,136,518 B2 * | 11/2006 | Griffin et al. | 382/133 |
| 7,672,708 B2 * | 3/2010 | Roberts | 600/410 |
| 7,747,308 B2 * | 6/2010 | Hundley et al. | 600/414 |
| 7,756,306 B2 * | 7/2010 | Nowinski et al. | 382/128 |
| 2006/0013454 A1 * | 1/2006 | Flewelling et al. | 382/128 |
| 2006/0239519 A1 * | 10/2006 | Nowinski et al. | 382/128 |
| 2008/0226151 A1 * | 9/2008 | Zouridakis et al. | 382/133 |
| 2009/0028403 A1 * | 1/2009 | Bar-Aviv et al. | 382/128 |

OTHER PUBLICATIONS

Hermosillo et al., "Automatic Segmentation of Vessels in Breast MR Sequences as a False Positive Elimination Technique for Automatic Lesion Detection and Segmentation Using the Shape Tensor", Proc. SPIE, Feb. 13, 2006, San Diego, CA, vol. 6144.

Carson et al., "Blobworld: Image Segmentation Using Expectation-Maximization and its Application to Image Querying", IEEE Transactions on Pattern Analysis and Machine Intelligence, vol. 24, No. 8, Aug. 2002, pp. 1026-1038.

* cited by examiner

*Primary Examiner* — Rodney Fuller
(74) *Attorney, Agent, or Firm* — Peter Withstandley

(57) ABSTRACT

A method and system for facilitating computer-aided detection (CAD) in which, in one implementation, image data is received (302) and iterations of an iterative segmentation process is performed on the image data. Each iterative segmentation process may include ascertaining whether a segment is normal (304), removing the segment from the image if ascertained to be normal (308) and transforming the shape of the segment (310). The iterative segmentation process may be stopped if a stop condition is met (312).

20 Claims, 4 Drawing Sheets

ITERATIVE SEGMENTATION OF IMAGES FOR COMPUTER-AIDED DETECTION

CROSS-REFERENCE TO RELATED APPLICATION

The present application claims the benefit of U.S. provisional application No. 61/046,823 filed Apr. 22, 2008, the entire contents of which are herein incorporated by reference.

TECHNICAL FIELD

The present disclosure relates to segmentation of images and more specifically, to iterative segmentation of images for computer-aided detection.

BACKGROUND

Various imaging systems and tools have been developed to assist physicians, clinicians, radiologists, etc. in evaluating medical images to diagnose medical conditions. For example, computer-aided detection (CAD) tools have been developed for various clinical applications to provide automated detection of medical conditions in medical images, such as colonic polyps and other abnormal anatomical structures such as lung nodules, lesions, aneurysms, calcification, in breast, heart or artery tissue, etc.

Magnetic resonance imaging (MRI) is a medical imaging technique that uses a powerful magnetic field to image the internal structure and certain functionality of a body. MRI is particularly suited for imaging soft tissue structures and is thus highly useful in the field of oncology for the detection of lesions.

Dynamic contrast-enhanced MRI (DCE-MRI) allows for many additional details pertaining to bodily soft tissue to be observed, to further aid in diagnosis and treatment of detected lesions. DCE-MRI may be performed by acquiring a sequence of magnetic resonance (MR) images that span a time before magnetic contrast agents are introduced into the patient's body and a time after the magnetic contrast agents are introduced. By imaging the patient's body sequentially, a set of images may be acquired that illustrate how the magnetic contrast agent is absorbed and washed out from various portions of the patient's body. This absorption and wash-out information may be used to characterize various internal structures within the body and provide additional diagnostic information.

However, when imaging the breast or other parts of the body for the purpose of performing computer-aided detection of potential lesions, it may be beneficial to first segment the acquired medical image data. Segmentation is the process of determining the contour delineating the region of interest from the remainder of the image. Segmentation of lesions in MRI analysis is important not only for measuring the size but also for measuring the morphological properties of lesions that are directly related to their malignancy. For example, a lesion with spikes (called spiculation) is more likely to be malignant than a lesion with a smooth and round shape.

In a CAD system, a lesion is segmented based on the amount of enhancement caused by the contrast agent. However, differences in the amount of enhancement inside a lesion may make segmentation difficult, thereby complicating the search for potential lesions. In addition, segmentation and morphological measurement typically presents a chicken-and-egg problem. Inaccurate segmentation often leads to incorrect morphological measurement of lesions. However, correct morphological measurement is required for accurate segmentation. For example, a gland with a thin sheet shape no longer looks like a thin sheet when it is merged with an oval benign lesion. The oval benign lesion may look malignant if the gland attached to it is confused as its spiculation. Correct morphological measurement of each part is necessary to detach the gland from the oval lesion.

Therefore, there is a need for a new methodology that effectively addresses these problems.

SUMMARY

A technology for facilitating computer aided detection (CAD) is described herein. In one implementation, the CAD technology includes receiving image data and performing iterations of an iterative segmentation process on the image data. Each iterative segmentation process may include ascertaining whether a segment is normal, removing the segment from the image if ascertained to be normal, and transforming the shape of the segment. The iterative segmentation process may be stopped if a stop condition is met.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present systems and methods. Furthermore, for ease of understanding, certain method steps are delineated as separate steps; however, these separately delineated steps should not be construed as necessarily order dependent in their performance.

The following description sets forth one or more implementations of systems and methods that facilitate computer aided detection (CAD). One implementation of the present technology performs iterative segmentation of an image. The present technology may iteratively ascertain whether each segment is normal by using, for example, morphology measurement techniques, remove the segment from the image if the morphological property is ascertained to be normal, and transform the image segments for further iterations. The image segment transformation may be performed using, for example, mathematical morphology operations, such as decomposition and merger operations. In this way, the technology searches for and detects segments of abnormal tissues (e.g., malignant lesions) and removes segments of normal tissues from the segmented image. This technology advantageously produces an image that is accurately segmented into regions of interest with high likelihood of abnormality or malignancy. The segmented image may then be, for example, subject to further analysis by the CAD system, or displayed for evaluation and diagnosis by a medical practitioner.

It is noted that, while a particular application directed to analysis of lesions in breast MRI is shown, the technology is not limited to the specific embodiment illustrated. The present technology has application to, for example, other types of images (e.g., computed tomography (CT) images, ultrasound images or radio isotope images) and other types of anatomical features, such as the prostate, kidney, liver or brain.

Figure 1:
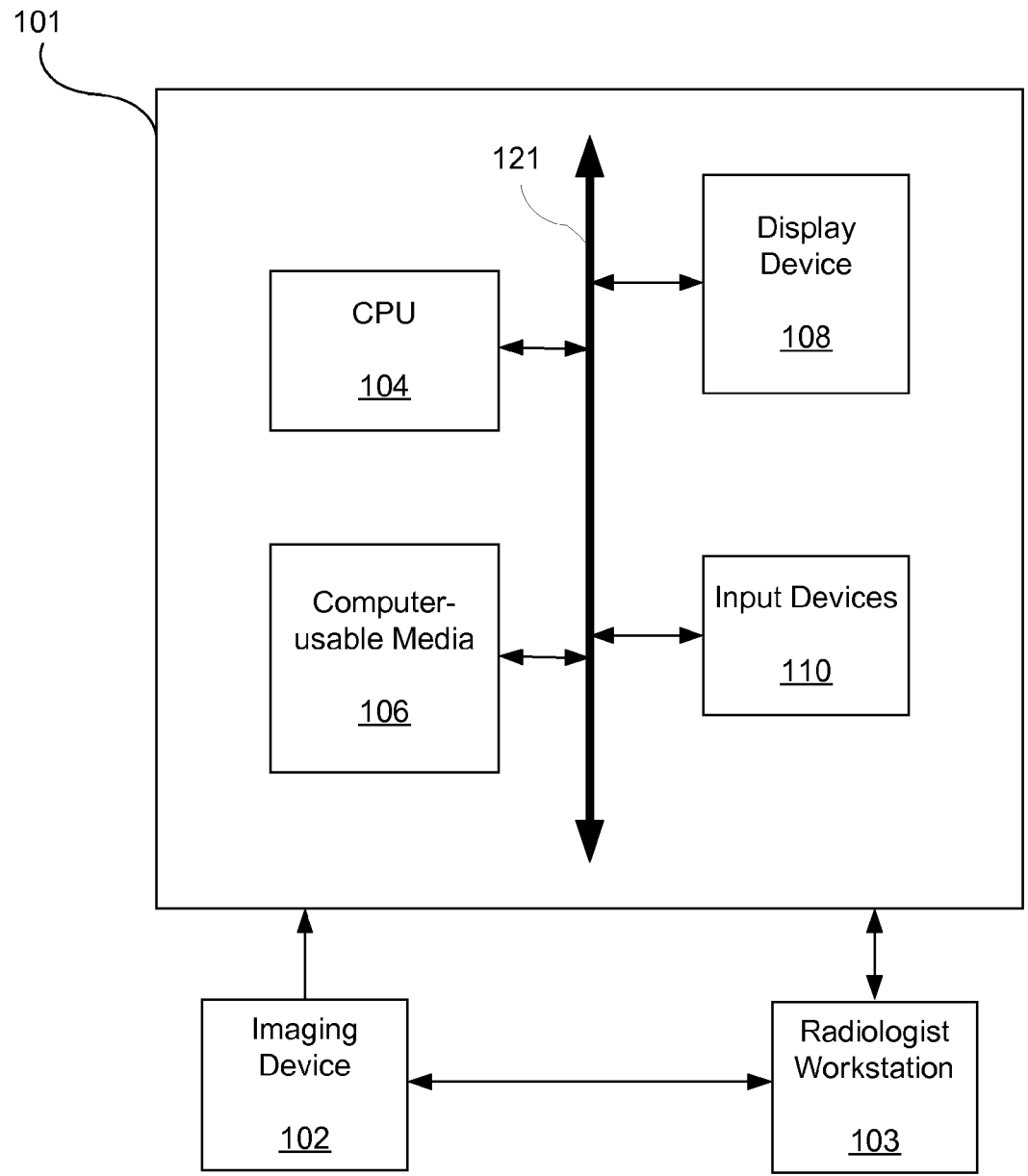
FIG. 1 shows a block diagram illustrating an exemplary CAD system.

FIG. 1 shows a block diagram illustrating an exemplary CAD system 100. The CAD system 100 includes a computer system 101 for implementing the framework as described herein. The CAD system 100 may be further connected to an imaging device 102 and a radiologist workstation 103, over a wired or wireless network. The imaging device 102 may be a radiology scanner such as a MR scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-usable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer readable program code tangibly embodied in computer-usable media 106. Computer-usable media 106 may include random access memory (RAM), read only memory (ROM), magnetic floppy disk, flash memory, and other types of memories, or a combination thereof. The computer-readable program code may be executed by CPU 104 to process images (e.g., MR or CT images) from imaging device 102 (e.g., MRI or CT scanner). As such, the computer system 101 is a general-purpose computer system that becomes a specific purpose computer system when executing the computer readable program code. The computer readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or combination thereof, which is executed via the operating system. Various other peripheral devices, such as additional data storage devices and printing devices, may be connected to the computer system 101.

The radiologist workstation 103 may include a computer and appropriate peripherals, such as a keyboard and display, and can be operated in conjunction with the entire system 100. For example, the radiologist workstation 103 may communicate with the imaging device 102 so that the image data collected by the imaging device 102 can be rendered at the radiologist workstation 103 and viewed on the display. Further, the radiologist workstation 103 may communicate directly with the computer system 101 to access and display previously processed image data, such as segmented image data processed by the framework described herein, so that a radiologist can manually verify the results of the framework.

Figure 2:
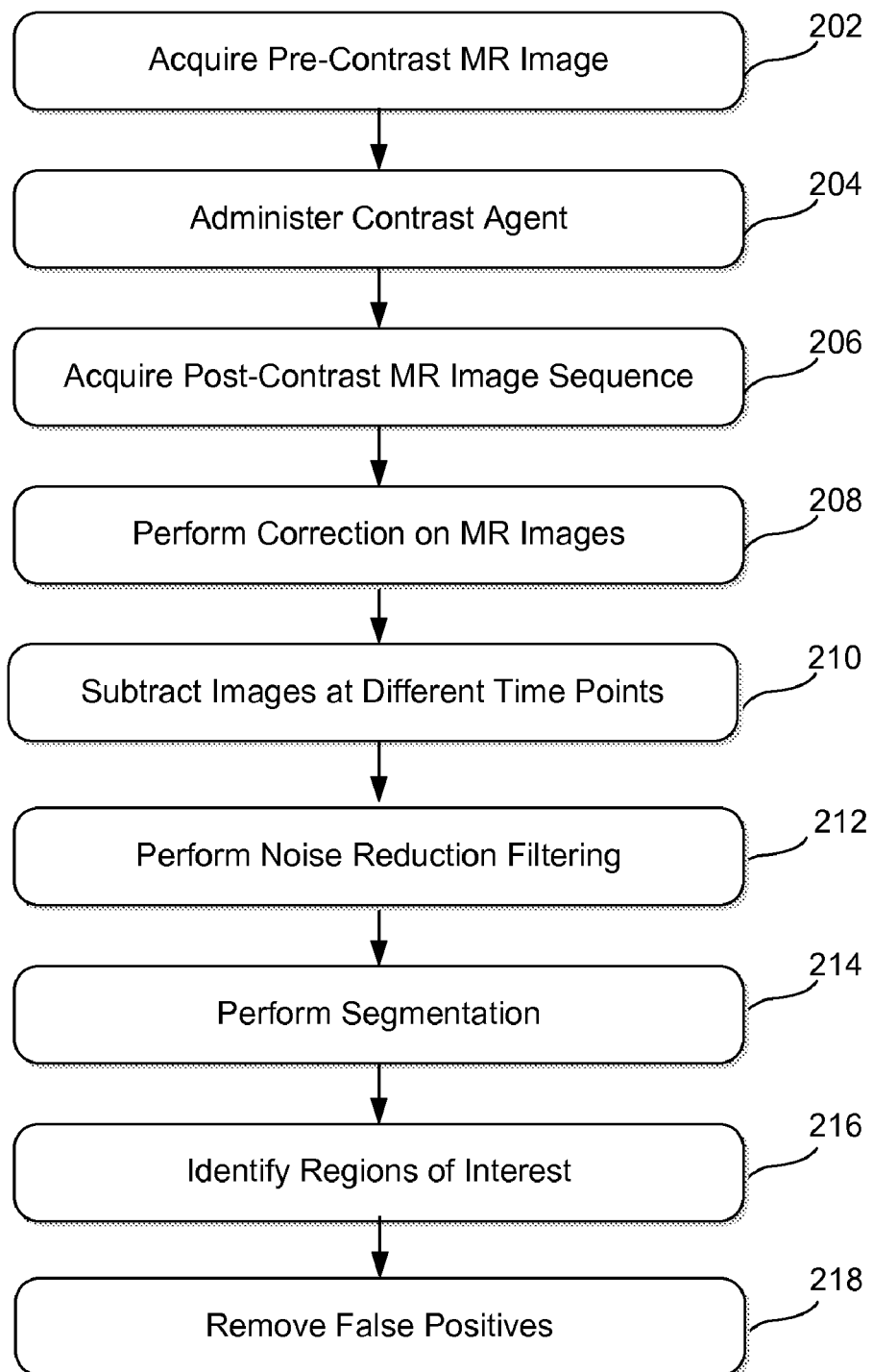
FIG. 2 shows an exemplary method which may be implemented by the CAD system.

FIG. 2 shows an exemplary method 200 which may be implemented by the CAD system 100. In the discussion of FIG. 2, continuing reference will be made to elements and reference numerals shown in FIG. 1. At step 202, the CAD system 100 acquires at least one pre-contrast MR image from, for example, a MRI scanner 102. The pre-contrast MR image may include an MR image taken of the patient before the magnetic contrast agent has been administered.

At step 204, the contrast agent is administered to the patient. The contrast agent may be a paramagnetic agent (e.g., gadolinium compound), a superparamagnetic agent (e.g., iron oxide nanoparticles), a diamagnetic agent (e.g., barium sulfate) or any other suitable magnetic agents. The contrast agent may be administered orally, intravenously or by another means. The contrast agent may be selected for its specific magnetic property that enhances the appearance of the anatomy or pathology of interest. By injecting the contrast agent into the patient's blood, vascular tissue may be highly visible in the MRI. Since malignant tumors tend to be highly vascularized, the use of the contrast agent may be highly effective for identifying regions suspected of being lesions.

At step 206, the CAD system 100 acquires a post-contrast MR image sequence acquired from, for example, a MRI scanner 102. The sequence of MR images may be acquired at regular intervals in time (e.g., a new image every minute). Additional information may be acquired from the MR image sequence by analyzing the way in which a region absorbs and washes out the contrast agent over time.

At step 208, the CAD system 100 may perform correction on the MR images. Correction includes, for example, motion correction, inhomogeneity correction, and/or other types of correction. Motion correction may be performed to remove the artifacts caused by the patient moving somewhat from image to image. Inhomogeneity correction may be performed to compensate for the effects of the inhomogenous magnetic field that was used to acquire the MR images. These corrective steps may be performed for each image after each image is acquired or for all images after all images have been acquired.

At step 210, the CAD system 100 may subtract images at different time points, to provide data that is indicative of the manner in which the contrast agent is absorbed and washed out from the imaged tissues. Subtraction may be performed by subtracting the pre-contrast MR image from each of the post-contrast MR images to obtain a set of original subtraction images illustrating the relative change in enhancement at each point in time. Alternatively, the CAD system 100 may combine the change information from each of the post-contrast MR images into a single cumulative subtraction image.

At step 212, the CAD system 100 may perform noise reduction filtering of the MR images to reduce or completely eliminate noise artifacts created by the subtraction process. The noise artifacts may appear as a randomly occurring set of dark and light specs often referred to as salt and pepper noise. To remove these artifacts, a noise reduction filter, such as a Gaussian low-pass filter, may be applied to the original subtraction images to produce a set of filtered subtraction images. Alternatively, any other form of conventional filter may be applied to the subtraction images. An elimination mask may then be created from the filtered subtraction image by removing voxels with enhancement values below a threshold value. The threshold value may be initially selected to be a predetermined percentage of a maximum enhancement value of a central region of a breast imaged in the DCE-MR images. The elimination mask may be used to remove noise image data from the original subtraction image.

At step 214, the CAD system 100 performs segmentation of the MR images to isolate regions of interest. A region of interest is a structure that has been determined to exhibit one or more properties that make it more likely to be abnormal (i.e. malignant) tissue than the regions of the tissue that are not determined to be regions of interest. Segmentation is the process of determining the contour delineating the region of interest from the remainder of the image. In making this determination, edge information and shape information may be considered. Edge information pertains to image intensity changes between the interior and exterior of the contour. Shape information pertains to the probable shape of the contour given the nature of the region of interest being segmented.

When searching for lesions in the breast using DCE-MRI, however, non-enhancing normal (i.e. benign) tissues may sometimes separate a lesion into multiple connected components. Conversely, enhancing normal tissues (e.g., glands or pectoral muscles) may be adjacent to a lesion and be confused as parts of the lesion, thereby making the location of the lesion more difficult. Furthermore, incorrect segmentation will cause inaccurate morphological measurement of the regions of interest. In turn, correct morphological measurement is necessary for accurate segmentation of the image data into regions of interest. Accordingly, exemplary implementations described herein seek to provide a method of automatic segmentation using an iterative approach to refine the segments, thereby facilitating fast and accurate detection of abnormal tissues such as breast lesions. These novel approaches to segmentation are discussed in detail below with respect to FIG. 3.

Turning again to FIG. 2, at step 216, the CAD system 100 identifies regions of interest after segmentation has been performed. Detection of the region of interest may be performed by systematically analyzing a neighborhood of voxels around each voxel of the image data to determine whether or not the voxel should be considered part of a region of interest. This determination may be made based on the acquired pre-contrast MR image as well as the post-contrast MR image. Factors such as size and shape may be considered. Moreover, the absorption and wash-out profile of a given region may be used to determine whether the region is suspicious. This is because malignant tumors tend to show a rapid absorption followed by a rapid wash-out. This and other absorption and wash-out profiles can provide significant diagnostic information.

At step 218, the CAD system 100 removes false positives. As described above, artifacts such as those caused by motion or magnetic field inhomogeneity may lead to the inclusion of one or more false positives. Various approaches may be used to reduce the number of regions of interest that have been identified due to an artifact, and thus false positives may be removed. Removal of false positives may be performed by systematically reviewing each region of interest multiple times, each time for the purposes of removing a particular type of false positive. Each particular type of false positive may be removed using an approach specifically tailored to the characteristics of that form of false positive.

After false positives have been removed (at step 218), the remaining regions of interest may be presented to the medical practitioner for further review and consideration. For example, the remaining regions of interest may be highlighted within a representation of the medical image data at the radiologist workstation 103. Quantitative data such as size and shape measurements may be presented to the medical practitioner along with the highlighted image data. The presented data may then be used to determine a further course of testing or treatment. For example, the medical practitioner may use the presented data to order a biopsy or refer the patient to an oncologist for treatment.

Figure 3:
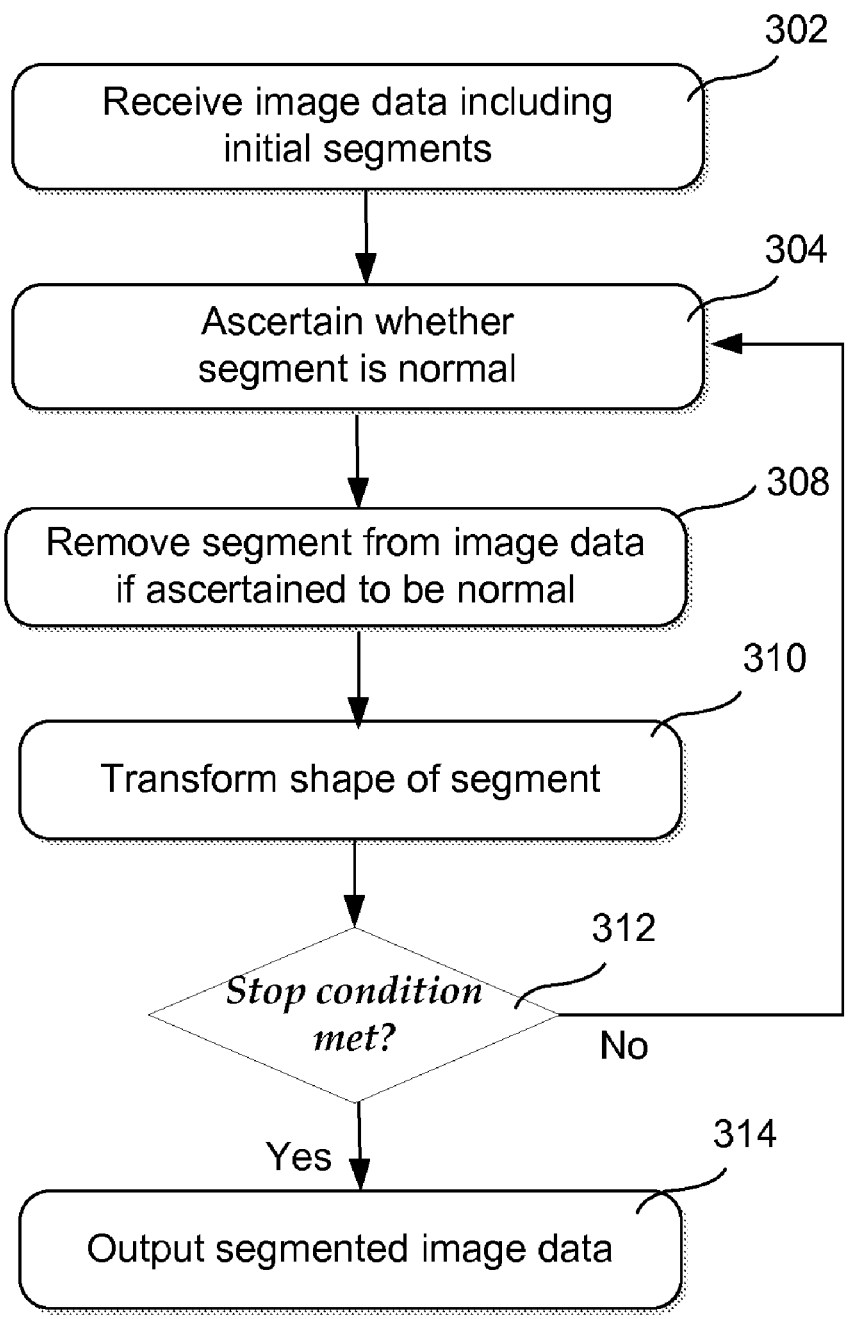
FIG. 3 shows an exemplary segmentation method which may be implemented by the CAD system.

FIG. 3 provides a possible implementation of step 214 of FIG. 2, but the present technology is not limited thereto. It is possible that other methods may be used instead of or in addition to the method of FIG. 3 to segment the regions of interest in the MR images. Segmentation of lesions in a breast MRI is shown as an example of how the method of segmentation may be performed. However, it is to be understood that these techniques may be performed on other anatomical structures.

The method of FIG. 3 is an optimization process that iteratively refines the segmentation of the MR image and removes segments that are obviously normal, leaving only lesions or regions of interest remaining as final candidates to be further analyzed by, for example, the CAD system 100 or a medical practitioner.

At step 302, image data may be received. The image data may include one or more grayscale images with initial segments or regions of interest delineated. The image data may be acquired as described in detail above with respect to FIG. 2, steps 202, 204 and 206, and processed as described in detail above with respect to FIG. 2, steps 208, 210 and 212. It is to be understood, however, that the present description is not intended to be limited to the steps described above, and may include additional steps or technical equivalents which operate in a similar manner, or exclude one or more steps in combination therewith.

In one implementation, the CAD system 100 then continues to perform iterations of an iterative process (steps 304, 308, 310) until a stop condition is met (step 312). At step 304, the CAD system 100 ascertains whether each segment in the image data is obviously normal or not. If the segment is obviously normal or benign, it need not be considered in further analyses and may therefore be discarded from the image data. In one implementation, to ascertain whether the segment is normal, at least one morphological property of the segment is measured (i.e. quantified) and evaluated using an objective function. The morphological property may be, for example, the volume, area, diameter, circularity, geometrical moment or any other geometrical parameters or a combination thereof. These parameters are used to represent local shape information or structure in the image. For example, the diameter is the maximum width of the segment. The volume is the total number of voxels in the segment. The geometrical moment may be computed based on, for example, eigenvalues of the shape tensor.

In one implementation, an objective function is evaluated for each segment in the image, based on its morphology. The objective function serves to indicate whether the segment is obviously normal (i.e. not of interest). The objective function may be defined by, for example, dividing the volume of the segment by the diameter$^2$ of the segment (i.e. volume/diameter$^2$). Other types of objective functions, such as the geometrical moment of the shape, are also useful.

The result of the objective function may then be compared to a threshold value to ascertain if it is obviously normal. The threshold value may be pre-determined and hard-corded, or dynamically determined using a machine learning technique or other statistical methods. If the result of the objective function is less than the threshold value, the segment is ascertained to be normal and is removed from the image. For example, if the (volume/diameter) of the segment is less than a threshold value (e.g., 0.35), the segment is shaped like a sheet and is therefore likely to be a normal gland. In another example, normal tubular objects (e.g., vessel) may be detected (and later removed) by comparing the geometrical moment of the shape with a threshold value.

At step 308, the segment is removed from the image data if ascertained to be normal. The segment maybe removed by, for example, setting the color of its voxels to the background color (i.e. color of non-segmented regions).

At step 310, the shape of the segment is transformed to further refine the segmentation. In one implementation, the shape of the segment is transformed by performing at least one mathematical morphology operation on the image data. Other types of transformation operations, such as thinning and region growing, may also be performed. In one implementation, the morphology operation comprises merger or decomposition. Other types of morphology operations may also be used. Decomposition and merger operations may be performed alternately at step 310. For example, if during the previous iteration cycle, decomposition was performed at step 310, a merger will be performed during the current iteration cycle at step 310. Conversely, if during the previous iteration cycle, merger was performed at step 310, the current morphology operation is a decomposition operation. Other types of sequences are also useful.

Figure 4A:
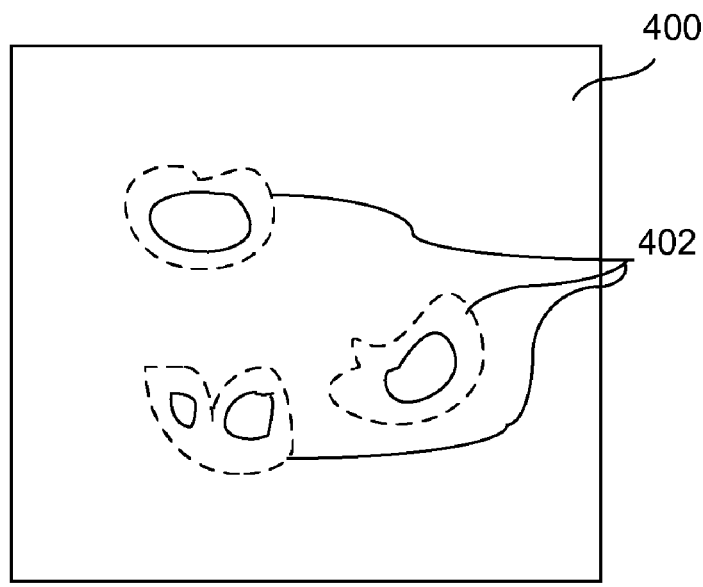
FIGS. 4a-b show exemplary decomposition and merger of an image.

FIG. 4a illustrates exemplary decomposition of segments 402 in the image 400. The broken lines represent segments 402 before decomposition, and the solid lines represent segments 402 after decomposition. The decomposition operation may include, for example, morphological opening or erosion sub-operations. Other types of sub-operations, such as thinning, may also be performed. Morphological opening and erosion may be performed alternately at step 310. A structuring element (SE), such as an open disk, a line segment or a square, may be used to probe the image during the morphological sub-operation. Other types of SE images or shapes may also be used.

Figure 4B:
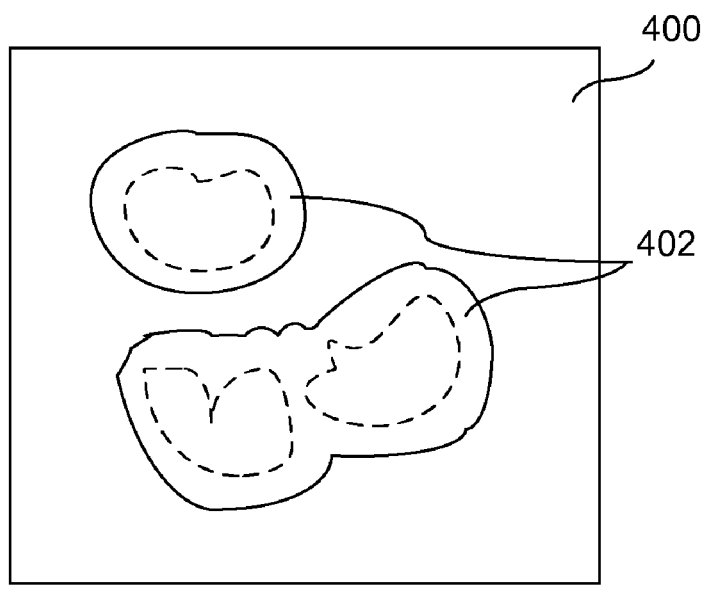

FIG. 4b illustrates exemplary merger of segments in the image 400. The broken lines represent segments 402 before merger, and the solid lines represent segments 402 after merger. The merger operation may include, for example, morphological closing or dilation, or other types of sub-operations. Morphological closing and dilation may be performed alternately at step 310. An open disk, a line segment, a square or other shapes, may be used as a SE to probe the image during the morphological sub-operation.

Referring back to FIG. 3, at step 312, it is determined whether a stop condition is met. For example, the stop condition may be convergence of the segmentation results of step 310, or it may be reaching a maximum number of iterations. In order to determine convergence, it may be determined whether the difference between the number of voxels in the regions of interest in the current and previous segmentation results is less than a threshold value. If the number of voxels is less than the threshold value, the results have converged and a stop condition is met. If the number of voxels is not less than the threshold value, the results have not converged and a stop condition is not met. Similarly, if the maximum number of iterations has been reached, a stop condition is met, and if the maximum number of iterations has not been reached, the stop condition is not met. When the stop condition has not been met, the method proceeds to step 304. When the stop condition has been met, the method proceeds to step 314.

At step 314, the segmented image data is output. Thus, normal tissues are removed from the segmented image by the exemplary method described above, leaving mainly lesions or regions of interest for further analysis by the CAD system 100. The segmented image may be stored in memory or storage of a computer system 101, or displayed as an image on a display of, for example, the radiologist workstation 103.

It is to be noted that iterative segmentation process (steps 304-310) may be performed based on any suitable optimization technique. For example, techniques such as a gradient descent method or a constrained regression method may be used. Statistical algorithms such as maximum likelihood, expectation maximization (EM) or belief propagation may be used to estimate the latent (or unobserved) parameters of the image data. Other optimization techniques may also be used. Latent parameters may include, for example, morphological properties of the segments or the likelihood of a voxel belonging to an area of interest. For example, a region of interest may comprise a large malignant lesion (area 1) and a small benign lesion (area 2), or two benign lesions (areas 1 and 2) of similar sizes. Areas 1 and 2 may be concatenated into one area initially. Whether a voxel belongs to area 1 or area 2 may be a latent variable.

Further, with respect to EM-based methods, for example, a cost function to be optimized may be approximated at each iteration, the approximation being based on the current state of the estimate and on observed data. The cost function may be, for example, the objective function as described above with respect to step 304 in FIG. 3.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for automated image analysis in a computer-aided detection method, the method performed by the computer comprising:
    (a) receiving, by a computer system, image data from an imaging device;
    (b) performing, by a processor of the computer system, iterations of an iterative segmentation process on the image data, each iterative segmentation process includes
        (i) ascertaining, by the computer system, whether a segment of the image data is normal,
        (ii) removing, by the computer system, the segment from the image data if ascertained to be normal, and
        (iii) transforming a shape of the segment; and
    (c) stopping, by the processor, the iterative segmentation process if a stop condition is met;
    (d) outputting, by the computer system, a result of the iterative segmentation process.

2. The method of claim 1 wherein the step (i) further comprises:
    measuring, by the processor, at least one morphological property of the segment;
    evaluating, by the processor, an objective function based on the morphological property to ascertain whether the segment is normal; and
    comparing, by the processor, a result of the objective function to a threshold value, wherein the segment is ascertained to be normal if the result is less than the threshold value.

3. The method of claim 2 further comprises determining the threshold value dynamically.

4. The method of claim 2 wherein the morphological property comprises volume, area, diameter, circularity, geometrical moment or a combination thereof.

5. The method of claim 2 wherein the step of evaluating the objective function comprises evaluating volume/diameter.

6. The method of claim 1 wherein the step (iii) comprises performing at least one mathematical morphology operation on the image data.

7. The method of claim 6 wherein the step (iii) comprises performing decomposition or merger on the image data.

8. The method of claim 7 wherein the step (iii) comprises performing decomposition and merger alternately on the image data.

9. The method of claim 7 wherein the step (iii) comprises performing opening or erosion on the image data.

10. The method of claim 7 wherein the step (iii) comprises performing closing or dilation on the image data.

11. The method of claim 1 wherein the step (iii) comprises performing thinning on the image data.

12. The method of claim 1 wherein the step (c) comprises stopping, by the processor, the iterative segmentation process if results from step (b) converge.

13. The method of claim 1 wherein the step (c) comprises stopping, by the processor the iterative segmentation process if a maximum number of iterations is reached.

14. The method of claim 1 wherein the iterative segmentation process is performed using an expectation maximization (EM)-based method.

15. A non-transitory computer usable medium having a computer readable program code embodied therein, said computer readable program code adapted to be executed to implement a computer-aided detection method comprising:
(a) receiving image data from an imaging device;
(b) performing, by a processor, iterations of an iterative segmentation process on the image data, each iterative segmentation process includes
(i) ascertaining whether a segment of the image data is normal,
(ii) removing the segment from the image data if ascertained to be normal, and
(iii) transforming a shape of the segment; and
(c) stopping, by the processor, the iterative segmentation process if a stop condition is met.

16. The computer usable medium of claim 15 wherein the step (i) comprises:
measuring, by the processor, at least one morphological property of the segment;
evaluating, by the processor, an objective function based on the morphological property to ascertain whether the segment is normal; and
comparing, by the processor, a result of the objective function to a threshold value, wherein the segment is ascertained to be normal if the result is less than the threshold value.

17. The computer usable medium of claim 16 wherein the step of evaluating the objective function comprises evaluating volume/diameter.

18. The computer usable medium of claim 15 wherein the step (iii) comprises performing at least one mathematical morphology operation on the image data.

19. A computer-aided detection system, comprising:
a memory device for storing non-transitory computer readable program code; and
a processor in communication with the memory device, the processor operative with the computer readable program code to receive image data from an imaging device, perform iterations of an iterative segmentation process on the image data, each iterative segmentation process includes ascertaining whether a segment of the image data is normal, removing the segment from the image data if ascertained to be normal, and transforming a shape of the segment, and stop the iterative segmentation process if a stop condition is met.

20. The system of claim 19 wherein the image data comprises magnetic resonance (MR) image data.

* * * * *